Sakuta et al.

[11] Patent Number: 4,487,633
[45] Date of Patent: Dec. 11, 1984

[54] WATER-INSEPARABLE CONCRETE COMPOSITION

[75] Inventors: Masaharu Sakuta, Tokyo; Soichi Kiya, Hachioji; Iwao Uchizaki, Tokyo; Yasuhiko Yoshioka, Mitaka; Koichi Ito, Tokyo; Toshio Saito, Kashiwa; Tadahiro Kaya, Kanagawa; Tsunetoshi Shioya; Yoshifumi Shimoyama, both of Fujisawa, all of Japan

[73] Assignees: Takenaka Komuten Co., Ltd., Osaka; Takenaka Doboku Co., Ltd.; Sankyo Chemical Industries Ltd., both of Tokyo, all of Japan

[21] Appl. No.: 507,544

[22] Filed: Jun. 24, 1983

[30] Foreign Application Priority Data

Sep. 22, 1982 [JP] Japan ................... 57-163900

[51] Int. Cl.$^3$ ............................................... C04B 7/35
[52] U.S. Cl. .................................. 106/90; 106/97; 106/314; 106/315
[58] Field of Search ............... 106/90, 97, 314, 315; 524/2, 4, 5

[56] References Cited

U.S. PATENT DOCUMENTS

| 3,868,753 | 1/1959 | Morgan et al. | 524/5 |
| 3,937,633 | 2/1976 | Knight et al. | 524/5 |
| 4,015,991 | 4/1977 | Persinski et al. | 106/90 |

*Primary Examiner*—James Poer
*Attorney, Agent, or Firm*—Lowe King Price & Becker

[57] ABSTRACT

A concrete composition is provided which has the property of being inseparable in water and no effect in delaying setting time or reducing strength. A polyacrylamide partial hydrolysate having a molecular weight of one million or higher and a hydrolysis degree of from 0.5 to 20% moles is present in an amount of 0.5 to 4% by weight based on the cement constituent proportion.

6 Claims, No Drawings

WATER-INSEPARABLE CONCRETE COMPOSITION

BACKGROUND OF THE INVENTION

The present invention relates to a water-inseparable concrete composition a concrete constitutent whereof is not separated or washed away in water and containing a proper proportion of an admixture capable of imparting viscosity to the cement, which does not become separated from an aggregate which is embedded therein to form concrete, and which has a strength comparable to or higher than that of a viscous cement containing no such admixture.

As concrete is being laid under water, the cement may become separated or washed away from a part of the aggregate upon contact with the water, either as the concrete mix is falling through the water or as the concrete mix is spreading in a widthwise direction under water. The part of the concrete mix from which the cement has been separated or washed away subsequently deteriorates. In order to prevent the cement from becoming separated from the concrete mix in water, a viscosity building agent or viscosity builder such as an acrylic polymer compound, a cellulose derivative or the like may be included in an amount ranging from about 2% to about 4% by weight based on the cement content of the mix. However, a concrete mix containing such a polymer viscosity builder tends to have a delayed setting time and to have a lower strength, particularly initially, than a concrete mix containing no such agent. This tendency becomes more pronounced as the amount of the viscosity builder is increased. These drawbacks are the biggest obstacle in improving the performance of concrete laid under water by the use of a viscosity builder.

SUMMARY OF THE INVENTION

The present invention has been made in consideration of this, and has for its object to provide a concrete composition which does not cause such a delay in setting time or reduction in strength, while retaining the ability to prevent separation of the cement and aggregate under water.

DETAILED DESCRIPTION OF THE PREFERRED EMBODIMENTS

A partial hydrolysate of polyacrylamide to be used for the present invention may be produced by the hydrolysis of a polyacrylamide or by the copolymerization of an acrylamide with sodium acrylate. When a partial hydrolysate of polyacrylamide having a hydrolysis degree of 0.5 to 20% moles is used, a concrete composition can be produced that causes no delay in concrete setting time and no reduction in concrete strength. Where the hydrolysis degree is below 0.5% mol, a reduction in strength will be caused. Where the hydrolysis degree exceeds 20% moles, both a delay in setting time and a reduction in strength will occur.

There is a positive interrelation between a molecular weight of the partial hydrolysate of polyacrylamide and a viscosity of its aqueous solution. In order to accomplish the object of the present invention, it is necessary to provide a concrete mix having a viscosity such as to prevent the separation of the cement from the concrete in water. A polymer compound should desirably be used having a molecular weight higher than one million, preferably higher than three millions, and more preferably higher than ten millions.

In order to provide a concrete or mortar mix having the property of being non-disintegrable in water, it is necessary to use the partial hydrolysate of polyacrylamide in the amount of 0.5% by weight or higher with respect to the cement content of a concrete or mortar mix. In the following description, references to mortar mix will be omitted because the description relating to a concrete mix is also applicable to a mortar mix. Where the amount of the polyacrylamide partial hydrolysate exceeds 4% by weight, a concrete mix is rendered so viscous as to be difficult to handle and to have a delayed setting time.

The partial hydrolysate of polyacrylamide may be used by pre-mixing it with the cement, by adding it to a concrete mix or by adding a solution of it in water to a concrete mix.

EXAMPLE 1

TABLE 1

| Water-cement ratio (%) | Air content (%) | Unit amounts (kg/m$^3$) | | | |
|---|---|---|---|---|---|
| | | Water | Cement | Fine aggregate | Coarse aggregate |
| 50 | 1 | 200 | 400 | 692 | 1,055 |

To a concrete mix of the constituent proportions as illustrated in Table 1 above was added in each case a polyacrylamide partial hydrolysate having a molecular weight of higher than 10 millions and a hydrolysis degree as shown in Table 2 below, in the amount of 2% by weight based on the cement content. The concrete constituents were then mixed to produce a specimen concrete mix 1 for both measurement while falling through water and compressive strength tests. The specimen concrete mix 1 for the falling through water test was charged into a container in the form of a truncated cone having a bottom diameter of 5 cm, a top diameter of 7 cm and a depth of 8 cm. The falling through water test was conducted by placing the test container with the specimen concrete mix 1 at a height of 10 cm above the water surface in a cylindrical container having a diameter of 20 cm and a height of 26 cm and containing water filled therein to a depth of 16 cm, and then pouring the specimen concrete mix 1 so as to fall by gravity into the water. The test results were obtained by measuring a turbidity of the water by transmittance at a wavelength of 660 mμ with a photoelectric photometer. Specimens for the compressive strength test were prepared by forming the concrete mix into the form of a cylinder having a diameter of 15 cm and a height of 30 cm, and then curing it in water at 20° C. The tests were carried out on the 7th and 28th days after curing. The test results are shown in Table 2 below.

TABLE 2

| Hydrolysis degree of polyacrylamide partial hydrolysate (% mole) | Transmittance (%) | Slump (cm) | Compressive strength (kg/cm$^2$) | |
|---|---|---|---|---|
| | | | 7th day | 28th day |
| Plain | 3.0 | 22.0 | 257 | 342 |
| 0.3 | 96.0 | 20.0 | 150 | 282 |
| 0.5 | 96.0 | 20.5 | 235 | 333 |
| 3 | 96.0 | 20.5 | 245 | 365 |
| 6 | 96.5 | 20.5 | 262 | 377 |
| 12 | 96.5 | 20.0 | 240 | 340 |
| 20 | 96.0 | 19.5 | 231 | 333 |
| 30 | 94.8 | 19.0 | 85 | 271 |

EXAMPLE 2

To a concrete mix having the same proportion as shown in Table 1 was added, in each case, a polyacrylamide partial hydrolysate having a hydrolysis degree of 6% moles in the amount of 0.5%, 1.0%, 2.0% and 4.0% by weight based on the cement content, respectively. The composition was then mixed in the same manner as in Example 1. The test results and the molecular weights of the polyacrylamide partial hydrolysates added are shown in Table 3 below.

TABLE 3

| Polyacrylamide partial hydrolysate | | | | |
|---|---|---|---|---|
| Amount (%) | Molecular weight in thousand | Transmittance (%) | Slump (cm) | 28-day compressive strength (kg/cm$^2$) |
| 0.5 | about 1,000 | 48.5 | 23.0 | 340 |
|  | about 3,000 | 64.0 | 22.5 | 358 |
|  | higher than 10,000 | 69.5 | 22.5 | 349 |
| 1.0 | about 1,000 | 58.0 | 21.0 | 358 |
|  | about 3,000 | 72.0 | 21.0 | 363 |
|  | higher than 10,000 | 89.5 | 21.5 | 368 |
| 2.0 | about 1,000 | 88.0 | 21.0 | 369 |
|  | about 3,000 | 92.0 | 20.5 | 375 |
|  | higher than 10,000 | 96.5 | 20.5 | 377 |
| 4.0 | about 1,000 | 97.0 | 18.0 | 328 |
|  | about 3,000 | 98.0 | 17.5 | 330 |
|  | higher than 10,000 | 99.5 | 17.0 | 331 |

What is claimed is:

1. A water-inseparable concrete composition, comprising a cement component, an aggregate, and a polyacrylamide partial hydrolysate having a molecular weight of not lower than one million and a hydrolysis degree of 0.5 to 20 mole percent, wherein the polyacrylamide is contained in an amount ranging from 0.5 to 4 percent by weight of a constitutent portion of the cement, and wherein the concrete composition is for use in laying underwater.

2. A concrete composition according to claim 1, wherein said polyacrylamide partial hydrolysate has a molecular weight of not lower than three million.

3. A concrete composition according to claim 1, wherein said polyacrylamide partial hydrolysate has a molecular weight of not lower than ten million.

4. A concrete composition according to claim 1, wherein said polyacrylamide partial hydrolysate is a copolymer of an acrylamide and sodium acrylate.

5. A concrete composition according to claim 1 wherein said polyacrylamide partial hydrolysate is obtained by hydrolizing a polyacrylamide.

6. A method for laying a concrete in water, comprising laying in water a concrete composition containing cement, an aggregate, and a polyacrylamide partial hydrolisate having a molecular weight of one million or more and a hydrolysis degree of 0.5 to 20 mole percent, blended in an amount from 0.5 to 4 percent based on the weight of the cement.

* * * * *